United States Patent [19]
Bowles et al.

[11] Patent Number: 5,530,597
[45] Date of Patent: Jun. 25, 1996

[54] APPARATUS AND METHOD FOR DISABLING INTERRUPT MASKS IN PROCESSORS OR THE LIKE

[75] Inventors: James E. Bowles, Austin; Mark Luedtke, Del Valle; Dale E. Gulick, Austin, all of Tex.

[73] Assignee: Advanced Micro Devices, Inc., Sunnyvale, Calif.

[21] Appl. No.: 346,834

[22] Filed: Nov. 30, 1994

Related U.S. Application Data

[63] Continuation of Ser. No. 917,503, Jul. 21, 1992, abandoned.

[51] Int. Cl.⁶ ........................................... G06F 9/46
[52] U.S. Cl. ..................... 395/735; 395/869; 364/941.1; 364/941.8; 364/947.4; 364/DIG. 2
[58] Field of Search ..................... 395/725, 325, 395/275, 650, 735, 869, 856, 825, 775

[56] References Cited

U.S. PATENT DOCUMENTS

| | | | |
|---|---|---|---|
| 4,004,283 | 1/1977 | Bennett et al. | 395/725 |
| 4,010,448 | 3/1977 | Bennett et al. | 340/172.5 |
| 4,282,573 | 8/1981 | Imai et al. | 364/431.11 |
| 4,344,133 | 8/1982 | Bruce, Jr. et al. | 395/775 |
| 4,420,806 | 12/1983 | Johnson, Jr. et al. | 395/725 |
| 4,616,314 | 10/1986 | Wilson et al. | 395/725 |
| 4,631,674 | 12/1986 | Blandy | 395/700 |
| 5,070,447 | 12/1991 | Koyama | 395/725 |
| 5,095,526 | 3/1992 | Baum | 395/725 |
| 5,121,472 | 6/1992 | Danish et al. | 395/275 |
| 5,177,747 | 1/1993 | Capps, Jr. et al. | 371/51.1 |
| 5,179,368 | 1/1993 | Lippincott | 340/707 |
| 5,193,187 | 3/1993 | Strout, II et al. | 395/650 |
| 5,249,284 | 9/1993 | Kass et al. | 395/425 |

FOREIGN PATENT DOCUMENTS 4135246  5/1992  Japan.

OTHER PUBLICATIONS

Vol. 016404 Aug. 26, 1992 Patent Abstracts of Japan.

*Primary Examiner*—Gopal C. Ray
*Attorney, Agent, or Firm*—Jenkens & Gilchrist

[57] ABSTRACT

An apparatus for enabling an interrupt under certain hardware condition even though the interrupt has been masked by software, includes structure for indicating a software condition, structure for indicating a hardware condition, and structure, that is responsive to both aforementioned structures, for generating an interrupt in response to the assertion of an interrupt request signal.

11 Claims, 5 Drawing Sheets

APPARATUS AND METHOD FOR DISABLING INTERRUPT MASKS IN PROCESSORS OR THE LIKE

This is a continuation, of application Ser. No. 07/917, 503, filed Jul. 21, 1992; now abandoned.

CROSS-REFERENCE TO RELATED APPLICATIONS

This application is related to the following U.S. patent applications:

| SERIAL NO. | TITLE | INVENTOR(S) |
|---|---|---|
| 07/917,497 | General I/O Port Interrupt Mechanism | Gulick et al. |
| 07/917,489 | Improved External Memory Access Control for a Processing Unit | Gulick, et al. |
| 07/917,488 | Method of Weak Pull-up Disable and Mechanism Therefor for Use with Microcontroller in Integrated Circuit and Cordless Telephone Using the Integrated Circuit | Bowles, et al. |
| 07/918,627 | Integrated Circuit and Cordless Telephone Using the Integrated Circuit | Gulick et al. |
| 07/918,626 | Modulator Test System | Peterson et al. |
| 07/918,625 | Keypad Scanner Process and Device and Cordless Telephone Employing the Mechanism | Gulick |
| 07/918,624 | Serial Interface Module and Method | Gulick, et al. |
| 07/918,631 | Low Power Emergency Telephone Mode | Peterson, et al. |
| 07/918,632 | In-Circuit Emulation Capability Mode in Integrated Circuit and Cordless Telephone Using the Integrated Circuit | Gulick, et al. |
| 07/918,622 | Clock Generator Capable of Shut-down Mode and Clock Generation Method | Peterson, et al. |
| 07/918,621 | Signal Averager | Gulick |

All of the related applications are filed on even date herewith, are assigned to the assignee of the present invention, and are hereby incorporated herein i n their entirety by this reference thereto.

BACKGROUND OF THE INVENTION

1. Field of the Invention

The present invention relates to interrupt controllers implemented in processors, and more particularly, to interrupt controllers having interrupts that may be masked by software.

2. History of the Prior Art

In a processor, interrupts enable the transfer of control between one software routine and another. An interrupt may be requested by an interrupt request signal as s erred by some internal or external device ( i.e., timer, I/O peripheral ) and received by a Central Processing Unit (CPU). The CPU will typically respond to the interrupt request by temporarily suspending the execution of whatever routine it is running at that time and executing an interrupt service routine. After the interrupt service routine has been executed, the CPU will then resume execution of the former software routine at the point of interruption.

From the foregoing, it can be seen that the use of interrupts allows the CPU to coordinate its activities with those of other devices in a way that eliminates the need for a CPU to waste time polling devices. Also, interrupts are useful in many applications where the processing of certain routines must be accurately timed relative to external events.

Processors generally provide the capability of disabling interrupts by software. Interrupts may be selectively disabled by the CPU by a "masking" technique. This is usually accomplished by the use of an interrupt-enable flip-flop with each interrupt request line. When the flip-flop is set to 1 by software, the flip-flop allows subsequent assertions of the associated interrupt request line to be recognized by the CPU. When the flip-flop is cleared by software, the interrupt request is "masked" and subsequent assertions are not recognized by the CPU.

Some processors, such as those belonging to the Advanced Micro Devices 8051 microcontroller family, provide the capability of masking any number of its interrupts at any time. The capability of masking all interrupts may be useful, for example, in avoiding the interruption of critical software routines, or allowing the CPU to ignore a request from a device until the CPU is ready to service it. There may be times, however, when a non-maskable interrupt may be needed. One such time is when an 8051 microcontroller is in its idle mode.

The idle mode of the 8051 microcontroller offers a means of reducing power consumption by gating off the internal clock signal to its CPU. In its standard configuration, the 8051 microcontroller allows the termination of its idle mode by either a hardware reset or the activation of any enabled interrupt. In some configurations of the 8051 microcontroller, however, the hardware reset mechanism is not available. Even if the hardware reset mechanism is available, it is often undesirable as a means of leaving the idle mode because it re-initializes the computer, thereby losing much of the work done up to that point. Therefore, it is often desirable, if not necessary, to leave at least one interrupt unmasked when the 8051 microcontroller enters idle mode, thereby allowing the microcontroller to exit idle mode by the assertion of an interrupt request.

Those skilled in the art have heretofore encountered a problem in providing for an unmasked interrupt upon the entry into a state such as the idle mode of the 8051 microcontroller. It is known that software is not a reliable method of providing for such an unmasked interrupt. Due to the complexity of modern software, it is difficult for a programmer to account for all possible routes by which the computer could enter into a state such as the idle mode. Also, the microprocessor may enter into such a state inadvertently due to software error or mis-executions in software caused by external noises. On the other hand, providing a permanently non-maskable interrupt is not a desirable method because of the need to mask all interrupts at certain times, as discussed above.

Based on the foregoing, it should be perceived that it may be beneficial for a processor to provide the capability of having all interrupts masked. The processor may enter certain states, however, which it may only exit via an interrupt. If all interrupts have been masked upon entry into such a state, the computer will be caught in a "fatal embrace", that is it will not have a way to exit that state. Although a number of steps have been taken heretofore to deal with this problem, there has yet to have been developed an apparatus or method for an interrupt controller that is extremely effective in coping with it. Accordingly, it should be perceived that it is a shortcoming and deficiency of the prior art that such an apparatus or method has not yet been developed.

SUMMARY OF THE INVENTION

The present invention overcomes the shortcomings and deficiencies of the prior art by providing an interrupt enable circuit capable of allowing an interrupt to be enabled and disabled by software at any time except under certain conditions, dictated by hardware, at which time the interrupt becomes non-maskable. The interrupt enable circuit includes structure for indicating a software condition, structure for indicating a hardware condition, and structure responsive to both aforementioned structures for generating an interrupt upon the assertion of an interrupt request signal. In certain embodiments, the interrupt is asserted when the hardware condition is indicated, regardless of the software condition. The structure for generating an interrupt may include structure for enabling the interrupt in response to the software condition and hardware condition, and structure for asserting the interrupt when the interrupt request is asserted and only if the interrupt is enabled.

The structure for indicating a software condition may include a programmable register that outputs a software enable signal. The structure for indicating a hardware condition may be a hardware circuit that outputs a hardware enable signal when the processor is in a particular state, such as the idle mode of the 8051 microcontroller. In other embodiments, the hardware circuit may output a hardware enable signal when an external signal is asserted. In still other embodiments, the structure for indicating a hardware condition may include both of the aforementioned hardware circuits types.

The structure for enabling the interrupt may include an OR gate that receives both the hardware enable signal and the software enable signal and outputs a combined enable signal.

The structure for asserting the interrupt may include an AND gate that receives the combined enable signal and the interrupt request signal and outputs the interrupt signal.

Furthermore, the present invention provides a method for generating an interrupt that has been disabled by software. The method provided by the present invention includes the steps of indicating a particular hardware condition, indicating a particular software condition, and generating the interrupt in response to the assertion of the interrupt request signal if the hardware condition is indicated, regardless of the software condition.

Accordingly, it is an object of the present invention to provide an interrupt enable circuit that allows a maskable interrupt to become non-maskable under certain hardware conditions.

Another object of the present invention is to protect against unnecessary loss of information by providing an alternative to a hardware reset as a means of exiting certain processor states.

Another object of the present invention is to prevent the possibility of the processor becoming locked into a certain state because all interrupts were masked by software at the time of entry into that state.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION

Figure 1:
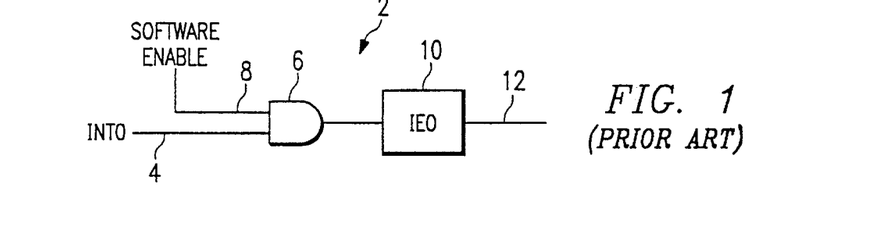
FIG. 1 is an interrupt enable circuit according to prior art.

Referring now to the drawings there is shown in FIG. 1 an interrupt enable circuit 2 that has been incorporated in devices belonging to the Advanced Micro Devices 8051 family of microcontrollers. The interrupt enable circuit 2 shown in FIG. 1 receives an external interrupt request INTO/which is inverted into interrupt request signal INTO conducted on line 4. The interrupt request signal INTO is then forwarded to an AND gate 6 which also receives a SOFTWARE ENABLE signal on line 8. The output of AND gate 6 is conducted to the input of latch 10. This latch 10 serves as interrupt flag IE0. The latch is sampled by the processor once every machine cycle via line 12. If the flag is in a set condition when sampled, the interrupt system of the processor may temporarily transfer control over the processor to the appropriate interrupt service routine.

Thus, the interrupt enable circuit 2 operates to generate an interrupt in response to the assertion of external interrupt request signal INTO/, if that interrupt has been enabled. The enabling and disabling of the interrupt is controlled by software, and effected by setting or clearing bit 0 of the interrupt enable register.

The interrupt enable register is bit addressable and described below.

IE: INTERRUPT ENABLE REGISTER

| EA | --- | ET2 | ES | ET1 | EX1 | ET0 | EX0 |

| | | |
|---|---|---|
| EA | IE. 7 | Disables all interrupts. If EA = 0, no interrupt will be acknowledged. If EA = 1, each interrupt source is individually enabled or disabled by setting or clearing its enable bit. |
| — | IE. 6 | Not implemented. |
| ET2 | IE. 5 | Enable or disable the Timer 2 overflow or capture interrupt (8052 only). |
| ES | IE. 4 | Enable or disable the serial port interrupt. |
| ET1 | IE. 3 | Enable or disable the Timer 1 overflow interrupt. |
| EX1 | IE. 2 | Enable or disable the External Interrupt 1. |

IE: INTERRUPT ENABLE REGISTER

| EA | --- | ET2 | ES | ET1 | EX1 | ET0 | EX0 |

| | | |
|---|---|---|
| ET0 | IE. 1 | Enable or disable the Timer 0 overflow interrupt. |
| EX0 | IE. 0 | Enable or disable the External Interrupt 0. |

If the bit is cleared, the corresponding interrupt is disabled. If the bit is set, the corresponding interrupt is enabled. Also, as can be seen from the description of the enable interrupt register, all interrupts provided by the 8051 microcontroller may be disabled by clearing bit 7 of the interrupt enable register.

Clearing either bit 0 or bit 7 of the interrupt enable register causes the SOFTWARE ENABLE signal on line 8 to be asserted. From FIG. 1, it may be seen that the enable signal is ANDed with the interrupt request signal on line 4. Thus, when the SOFTWARE ENABLE signal on line 8 is high, the assertion of INT0 on line 4 will set latch 10, thereby generating an interrupt. If the SOFTWARE ENABLE signal on line 8 is low, the interrupt is masked. The assertion of INT0 will not affect latch 10 and thus will not generate an interrupt.

Microcontrollers in the 8051 family, like many other devices known in the art, have the capability of masking all interrupts provided by the microcontroller. As discussed previously, this capability is regarded by those skilled in the art as useful in, for example, preventing unwanted interruptions during critical software routines. It is this same capability, however, that poses a problem when the processor enters certain states for which an enabled interrupt may be required. An example of such a state is the idle mode discussed previously in the background of the invention section. If all interrupts are disabled at the time the processor enters the idle mode, then the only means of terminating the idle mode is by hardware reset. A hardware reset is undesirable because it re-initializes the processor thereby losing all data accumulated up to that point. In applications where a hardware reset is not an available option, the processor is left in a fatal embrace. Thus, it would be beneficial to provide an interrupt capable of being masked at all times except when the processor is in certain states, such as the idle mode, during which time the interrupt remains enabled. The present invention provides such a capability.

Figure 2:
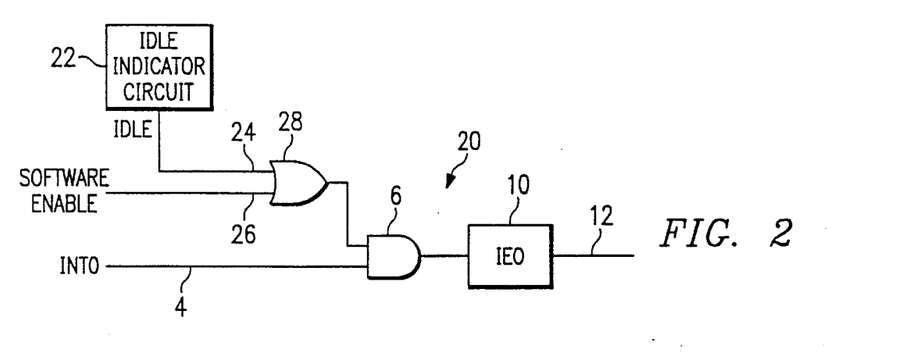
FIG. 2 is an embodiment of an interrupt enable circuit, according to the teachings of the present invention, which is responsive to an idle state indication.

FIG. 2 shows an interrupt enable circuit according to the teachings of the present invention that provides an interrupt that may be masked by software but that becomes a non-maskable interrupt while the processor is in the idle mode. To the interrupt enable circuit 2 shown in FIG. 1, there is added an IDLE INDICATOR CIRCUIT 22 that asserts an IDLE signal on line 24 while the processor is in the idle mode. The IDLE signal on line 24 is received along with the SOFTWARE ENABLE signal on line 26 by OR gate 28. The output of OR gate 28 is then ANDed with the interrupt request signal INT0. As before, the output of AND gate 6 is forwarded to latch 10 which serves as the interrupt flag IE0.

If the processor enters into an idle mode, the IDLE INDICATOR CIRCUIT 22 will assert the IDLE signal on line 24 which, in turn, will cause the output of OR gate 28 to go high regardless of the state of the SOFTWARE ENABLE signal on line 26. As long as the OR gate output 28 remains at a high level, the assertion of the interrupt request signal INT0 on line 4 will set latch 10, thus generating the interrupt. The IDLE signal, and thus the output of OR gate 28 will remain high as long as the processor remains in the IDLE state. Therefore, while the processor is in the IDLE mode, the assertion of the interrupt request signal INT0 may set the interrupt flag IE0 and be recognized by the processor even though the interrupt has been masked by software. When the processor is not in the idle mode, the IDLE signal on line 24 will remain low and the enabling and disabling of the interrupt will be determined by the SOFTWARE ENABLE signal on line 26.

Based on the foregoing, it may now be seen that the present invention provides an interrupt enable circuit through which an interrupt, that may be disabled and enabled by software control, becomes non-maskable under certain hardware conditions. An embodiment of the interrupt enable circuit according to the teachings of the present invention may include structure for indicating a software condition, structure for indicating a hardware condition, and structure, responsive to both aforementioned structures, for generating an interrupt upon the assertion of an interrupt request signal. In some embodiments, the structure for indicating a software condition may include a programmable register that outputs a software enable signal, and the structure for indicating a hardware condition may include a hardware circuit that output a hardware enable signal, such as the IDLE signal, when the processor is in the idle mode. The structure for generating an interrupt may include an OR gate that receives the software enable signal and the hardware enable signal and that outputs a combined enable signal, and an AND gate that receives the combined enable signal and the interrupt request signal and that outputs a signal that sets an interrupt flag.

Figure 3:
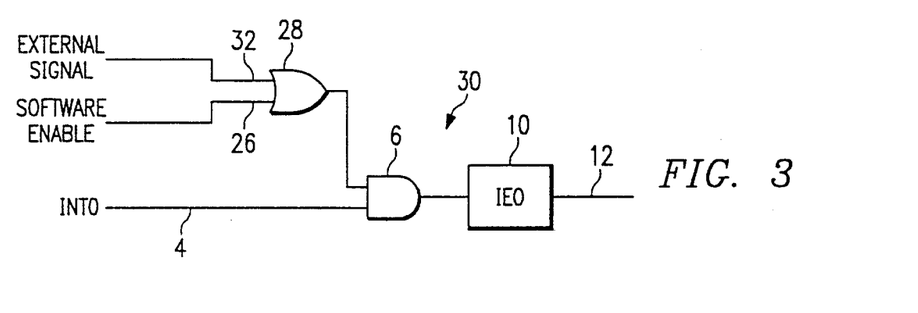
FIG. 3 is an embodiment of an interrupt enable circuit, according to the teachings of the present invention, responsive to an external signal.
Figure 4:
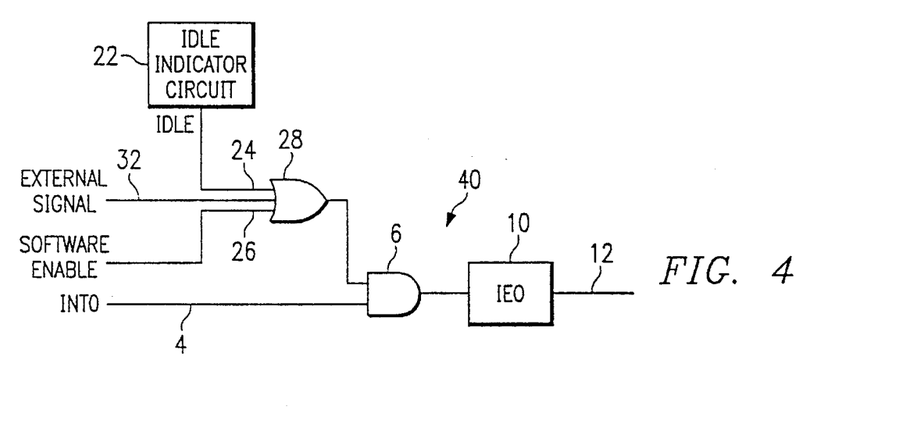
FIG. 4 is an embodiment of an interrupt enable circuit, according to the teaching of the present invention, responsive to an idle state indication and an external signal.

Other possible embodiment of the present invention may be seen in FIGS. 3 and 4. In FIG. 3, the IDLE INDICATOR CIRCUIT 22 and its associated IDLE signal on line 24 shown in FIG. 2 are now replaced by an EXTERNAL SIGNAL that is generated external to the processor and received on line 32. In such an embodiment, the interrupt remains maskable by software unless EXTERNAL SIGNAL on line 32 is asserted. While EXTERNAL SIGNAL remains asserted, the interrupt remains enabled regardless of software attempts to disable the interrupt.

The interrupt enable circuit shown in FIG. 4 shows an embodiment of the present invention which combines the circuits shown in FIGS. 2 and 3. OR gate 28 now receives, along with the SOFTWARE ENABLE signal on line 26, the EXTERNAL SIGNAL on line 32, and the IDLE signal on line 24 received from IDLE INDICATOR CIRCUIT 22. While both the EXTERNAL SIGNAL and the IDLE signal remain low, the enabling and disabling of the interrupt remains under software control. The interrupt becomes enabled and non-maskable by software, however, when either the IDLE signal is asserted or when EXTERNAL SIGNAL is asserted.

The foregoing description shows only certain particular embodiments of the present invention. However, those skilled in the art will recognize that many modifications and variations may be made without departing substantially from the spirit and scope of the present invention. Accordingly, it should be clearly understood that the form of the invention described herein is exemplary only and is not intended as a limitation on the scope of the invention.

Figure 5A:
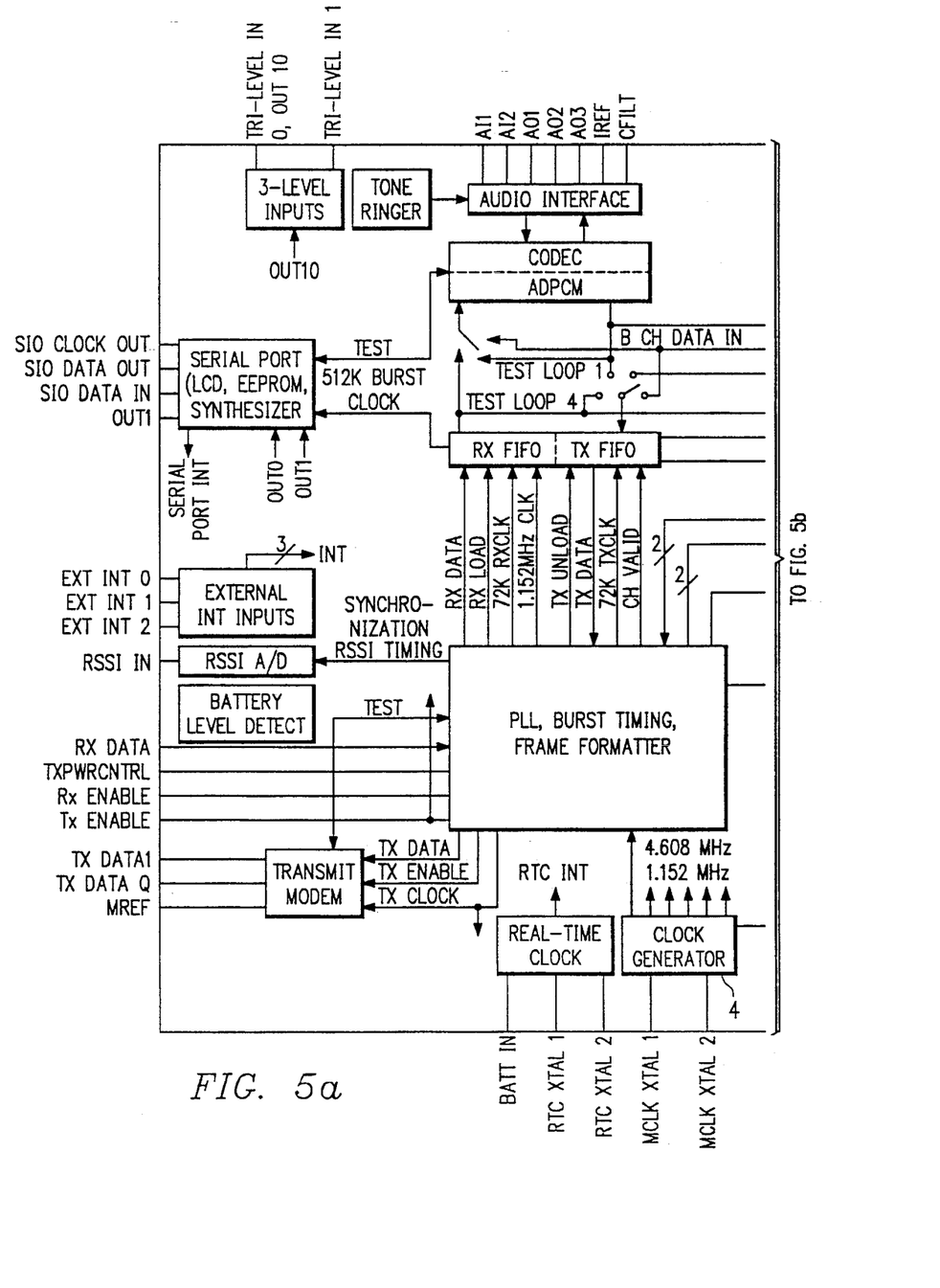
FIGS. 5a and 5b are block diagrams of an integrated circuit including an 8051 microcontroller employing an interrupt enable circuit according to the teachings of the present invention.
Figure 5B:
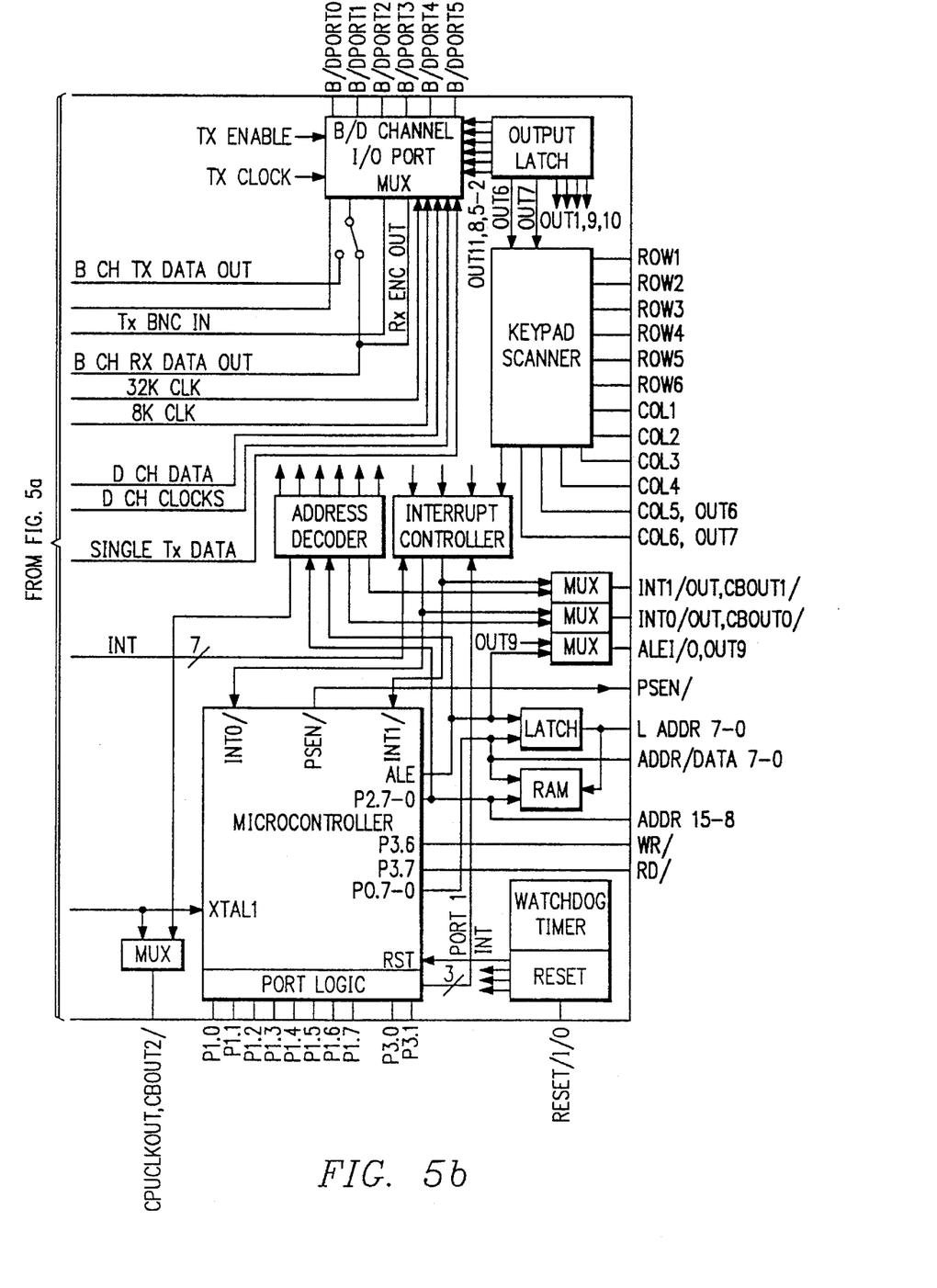

Furthermore, it should be understood that the interrupt enable circuit of the present invention may be implemented in a variety of systems. For example, FIG. 5 shows a block diagram of an integrated circuit including an 8051 microcontroller having the interrupt enable circuit shown in FIG. 2. The interrupt enable circuit of the present invention is beneficial in such an application as a safeguard against the IC entering shut-down mode with all interrupts disabled. Details regarding the shut-down mode capability of the IC are set forth at length in the related case entitled CLOCK GENERATOR CAPABLE OF SHUT-DOWN MODE AND CLOCK GENERATION METHOD. The 8051 microcontroller will typically be programmed into its idle mode when the IC has been programmed into the shut-down mode. If the IC is in shut-down mode and the microcontroller is in the idle mode, the condition of the microcontroller's interrupt mask bits (Interrupt Enable register bits 7, 2, and 0) is ignored, enabling the INT0/ and INT1/ interrupts. Shut-down mode may be terminated by reset, the any key down indication from the keypad scanner, or any non-masked interrupt. All of these conditions cause an interrupt request to be generated. Once the IC exits shut-down mode, the interrupt request is generated to the microcontroller as either external interrupt INT0/ or INT1/. Because the microcontroller implements the interrupt enable circuit of the present invention, the interrupt request will be recognized by the microcontroller even if they were masked by software when the microcontroller entered the idle mode. Thus, the microcontroller is allowed to leave the idle state as a result of the interrupt request.

Figure 6:
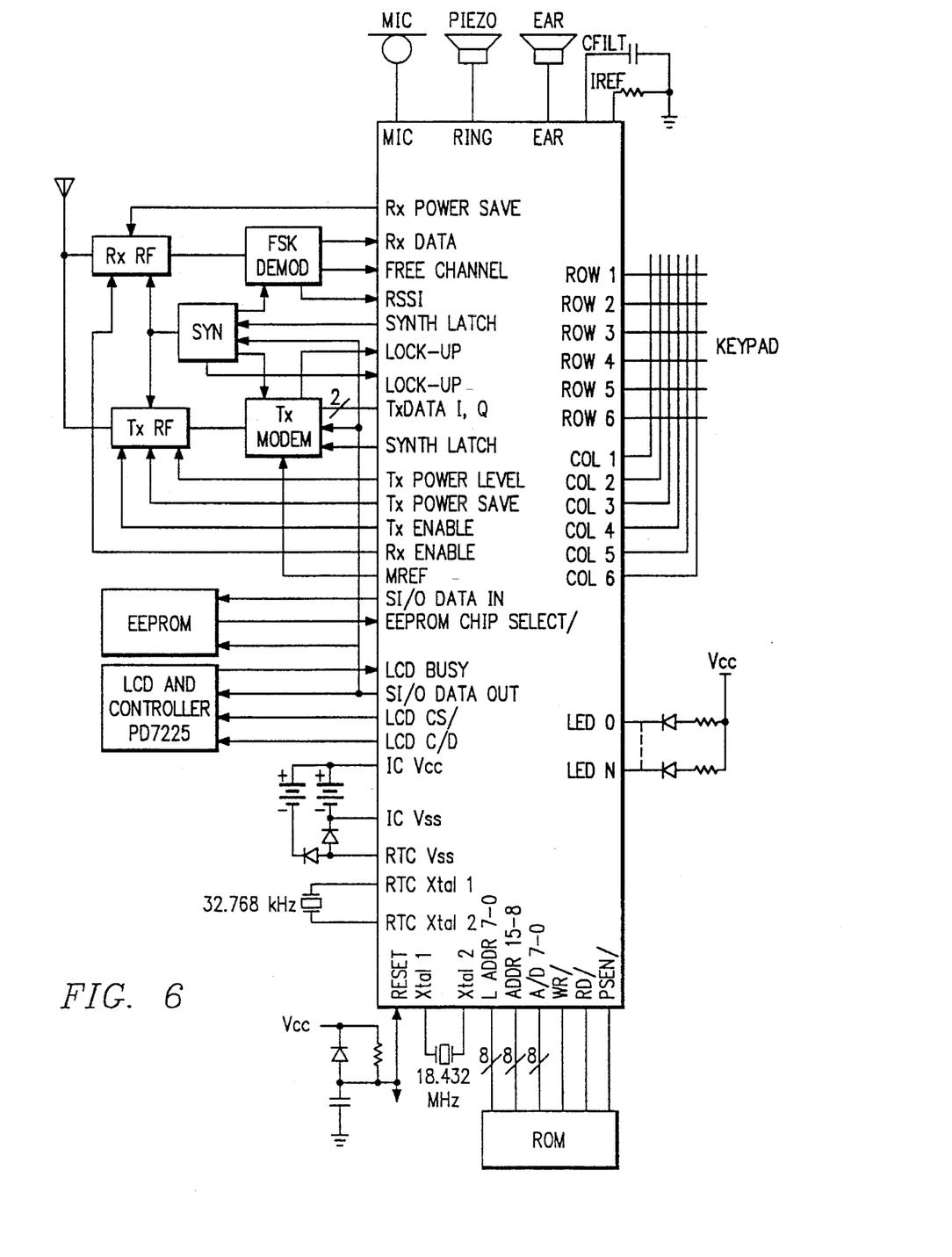
FIG. 6 is a block diagram of a handset unit of a cordless telephone employing the integrated circuit of FIG. 5.
Figure 7:
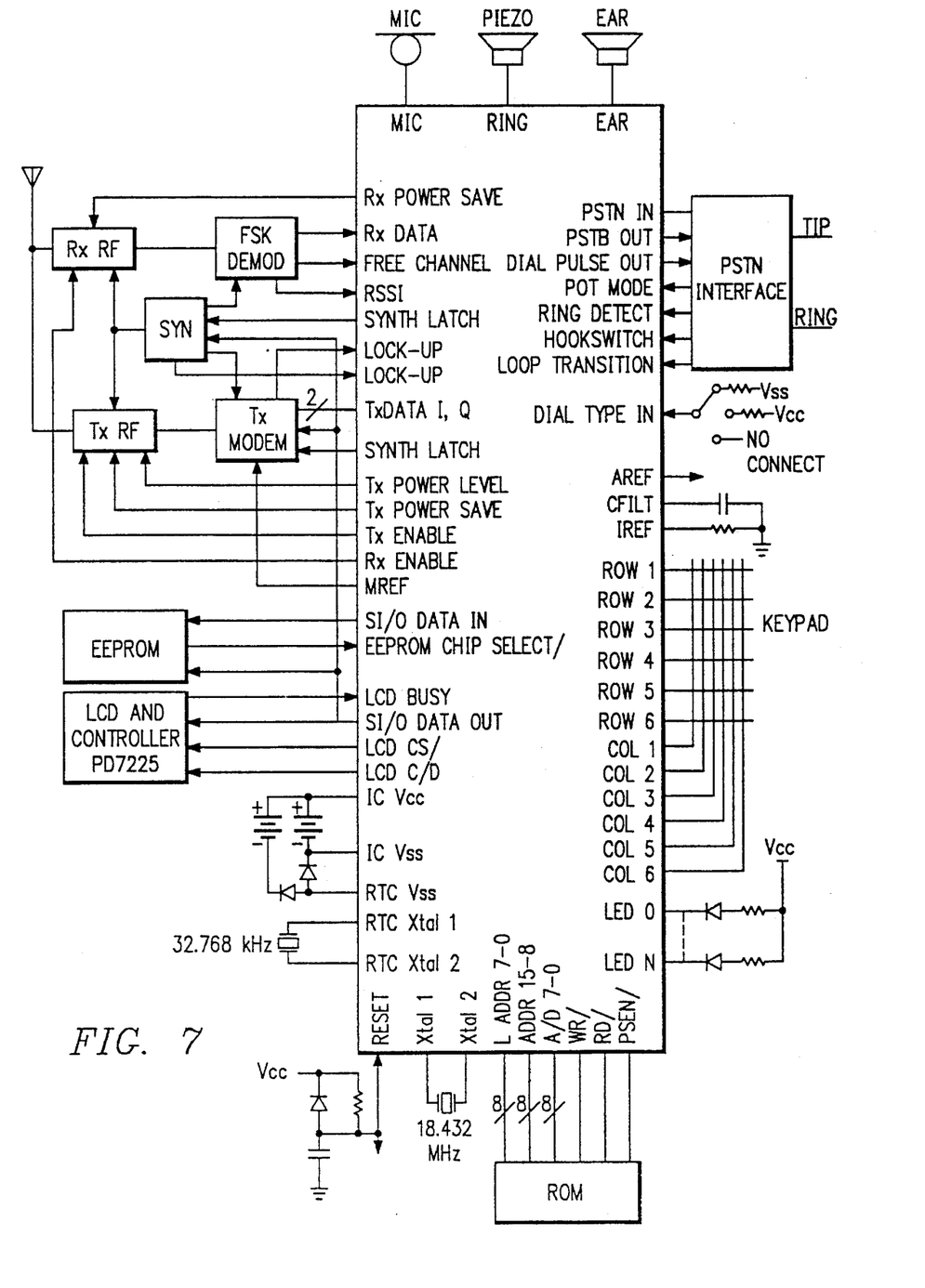
FIG. 7 is a block diagram of a base unit of a cordless telephone employing the integrated circuit of FIG. 5.

Furthermore, the IC of FIG. 5 may operate in a cordless telephone. FIGS. 6 and 7 describes how the IC of FIG. 5 may be incorporated into the handset unit and base unit a cordless telephone, respectively. These implementations are described at length in various of the related cases, especially the one entitled INTEGRATED CIRCUIT AND CORDLESS TELEPHONE USING THE INTEGRATED CIRCUIT.

Obviously, numerous modification and variations are possible in view of the teachings above. Accordingly, within the scope of the appended claims, the present invention may be practiced otherwise than as specifically described hereinabove.

What is claimed is:

1. An interrupt mask disable circuit comprising:
   first logic circuitry operably coupled to receive an interrupt request and a mask signal and to provide an interrupt signal when the interrupt request is active and the mask signal is disabled, and to provide a non-interrupt signal when the mask signal is enabled regardless of whether the interrupt request is active or inactive; and
   second logic circuitry operably coupled to receive a mask activation signal and a mask override signal and to produce the mask signal, wherein the mask signal is enabled when the mask activation signal is active and the mask override signal is not enabled and wherein the mask signal is disabled when the mask override signal is active regardless of whether the mask activation signal is enabled or disabled.

2. The interrupt mask disable circuit of claim 1, wherein the mask activation signal is enabled based on a software condition.

3. The interrupt mask disable circuit of claim 1, further comprises a programmable register that outputs the mask activation signal.

4. The interrupt mask disable circuit of claim 1, wherein the mask override signal is enabled based on a hardware condition.

5. The interrupt mask disable circuit of claim 4, further comprises being incorporated within a processor, and wherein the hardware condition occurs when said processor is in a particular state.

6. An apparatus as recited in claim 5 wherein said particular state comprises an idle mode.

7. The interrupt mask disable circuit of claim 5, wherein the hardware condition occurs in response to an external enable signal generated external to said processor.

8. The interrupt mask disable circuit of claim 1, wherein the second logic circuitry comprises an OR gate.

9. The interrupt mask disable circuit of claim 1, wherein the first logic circuitry comprises an AND gate.

10. A processor comprising:
    microcontroller:
    memory operably coupled to the microcontroller: and
    interrupt control circuit that includes:
      first logic circuitry operably coupled to receive an interrupt request and a mask signal and to provide an interrupt signal to the microcontroller when the interrupt request is active and the mask signal is disabled, and to provide a non-interrupt signal when the mask signal is enabled regardless of whether the interrupt request is active or inactive: and
      second logic circuitry operably coupled to receive a mask activation signal and a mask override signal and to produce the mask signal, wherein the mask signal is enabled when the mask activation signal is active and the mask override signal is not enabled and
    wherein the mask signal is disabled when the mask override signal is active regardless of whether the mask activation signal is enabled or disabled.

11. A method for masking an interrupt, the method comprising the steps of:
    a) receiving an interrupt signal, a mask signal, and a mask override signal;
    b) providing the interrupt signal to a processor when the mask override signal is enabled or when the mask signal and the mask override signal are disabled; and
    c) masking the interrupt signal from when the mask signal is enabled and the mask override signal is disabled.

* * * * *

(12) EX PARTE REEXAMINATION CERTIFICATE (10117th)
United States Patent
Bowles et al.

(10) Number: US 5,530,597 C1
(45) Certificate Issued: Apr. 17, 2014

(54) APPARATUS AND METHOD FOR DISABLING INTERRUPT MASKS IN PROCESSORS OR THE LIKE

(75) Inventors: James E. Bowles, Austin, TX (US); Mark Luedtke, Del Valle, TX (US); Dale E. Gulick, Austin, TX (US)

(73) Assignee: Norman IP Holdings, LLC, Tyler, TX (US)

Reexamination Request:
No. 90/012,781, Feb. 4, 2013

Reexamination Certificate for:
Patent No.: 5,530,597
Issued: Jun. 25, 1996
Appl. No.: 08/346,834
Filed: Nov. 30, 1994

Related U.S. Application Data (63) Continuation of application No. 07/917,503, filed on Jul. 21, 1992, now abandoned.

(51) Int. Cl.
*G06F 1/24* (2006.01)
*G06F 9/48* (2006.01)
*G06F 13/24* (2006.01)
*G06F 9/46* (2006.01)
*G06F 13/20* (2006.01)

(52) U.S. Cl.
USPC .............................................. 710/262; 710/49

(58) Field of Classification Search
None
See application file for complete search history.

(56) References Cited

To view the complete listing of prior art documents cited during the proceeding for Reexamination Control Number 90/012,781, please refer to the USPTO's public Patent Application Information Retrieval (PAIR) system under the Display References tab.

*Primary Examiner* — Michael J. Yigdall (57) ABSTRACT

An apparatus for enabling an interrupt under certain hardware condition even though the interrupt has been masked by software, includes structure for indicating a software condition, structure for indicating a hardware condition, and structure, that is responsive to both aforementioned structures, for generating an interrupt in response to the assertion of an interrupt request signal.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 6 is confirmed.

Claims 1-5, 10 and 11 are cancelled.

Claims 7-9 were not reexamined.

* * * * *